US008407080B2

(12) United States Patent
Jayaraman et al.

(10) Patent No.: US 8,407,080 B2
(45) Date of Patent: Mar. 26, 2013

(54) MANAGING AND MONITORING CONTINUOUS IMPROVEMENT IN INFORMATION TECHNOLOGY SERVICES

(75) Inventors: Sairam Jayaraman, Bangalore (IN); Walid M. Kobrosly, Round Rock, TX (US); David M. Northcutt, Chester, NJ (US); Steven W. Rohrssen, Poughkeepsie, NY (US); Mithkal M. Smadi, Round Rock, TX (US); Padmanaban Sukhumaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 12/861,220

(22) Filed: Aug. 23, 2010

(65) Prior Publication Data
US 2012/0046999 A1 Feb. 23, 2012

(51) Int. Cl.
*G06Q 10/00* (2012.01)
(52) U.S. Cl. .................. 705/7.39; 705/7.26; 705/7.36
(58) Field of Classification Search ............... 705/7.39, 705/7.17, 7.23, 7.25, 7.26, 7.36
See application file for complete search history.

(56) References Cited

U.S. PATENT DOCUMENTS

| 7,222,121 | B2 | 5/2007 | Casati et al. |
| 7,346,678 | B1* | 3/2008 | Zhu et al. ...................... 709/224 |
| 7,590,552 | B2* | 9/2009 | Barker et al. ................ 705/7.23 |
| 2002/0169658 | A1* | 11/2002 | Adler .............................. 705/10 |
| 2003/0172145 | A1 | 9/2003 | Nguyen |
| 2003/0177160 | A1* | 9/2003 | Chiu et al. .................... 709/100 |
| 2003/0216926 | A1* | 11/2003 | Scotto et al. ...................... 705/1 |
| 2004/0103076 | A1* | 5/2004 | Casati et al. ...................... 707/1 |
| 2006/0059253 | A1 | 3/2006 | Godoman et al. |
| 2006/0064486 | A1* | 3/2006 | Baron et al. .................. 709/224 |
| 2007/0016457 | A1* | 1/2007 | Schreiber et al. ................ 705/7 |
| 2007/0282692 | A1 | 12/2007 | Bishop et al. |
| 2008/0126163 | A1* | 5/2008 | Hogan et al. ...................... 705/8 |

(Continued)

OTHER PUBLICATIONS

Kumaran et al., "Using a model-driven transformational approach and service-oriented architecture for service delivery management", IBM Systems Journal, vol. 46, No. 3, 2007, pp. 513-529.

(Continued)

*Primary Examiner* — Thomas Dixon
*Assistant Examiner* — Gerald Vizvary
(74) *Attorney, Agent, or Firm* — Yee & Associates, P.C.; Arthur Samodovitz

(57) ABSTRACT

A method for managing performance of an IT service delivery process to ensure the changes meet service performance objectives. Key performance metrics (KPIs) of a service delivery process are collected in a continuous manner at defined time intervals, both before a change to improve performance is applied to the process (baseline measurements) and after a change is applied to the process (post-change measurements). A process behavior graph is generated comprising each baseline and post-change performance measurement at the time interval collected, the time interval at which the change was applied to the process, and the performance objectives for the process. The graph is displayed to a user to enable the user to determine the impact the change has on the service delivery process in view of differences between the baseline and post-change performance measurements, and to determine whether the process meets performance objectives in view of the performance objectives.

16 Claims, 5 Drawing Sheets

U.S. PATENT DOCUMENTS

| | | | |
|---|---|---|---|
| 2009/0192858 A1* | 7/2009 | Johnson | 705/8 |
| 2009/0198534 A1* | 8/2009 | Brown et al. | 705/7 |
| 2009/0276256 A1* | 11/2009 | Bhamidipaty et al. | 705/7 |
| 2011/0096074 A1* | 4/2011 | Agarwal | 345/440 |
| 2008/0208667 A1* | 8/2008 | Lymbery et al. | 705/8 |
| 2008/0249825 A1* | 10/2008 | Kunjur et al. | 705/8 |
| 2008/0312990 A1* | 12/2008 | Byrne | 705/7 |

OTHER PUBLICATIONS

"Human Services Integration Results of a GAO Cosponsored Conference on Modernizing Information Systems", US General Accounting Office Report to Congressional Committees, Jan. 2002, pp. 1-441.

* cited by examiner

MANAGING AND MONITORING CONTINUOUS IMPROVEMENT IN INFORMATION TECHNOLOGY SERVICES

BACKGROUND

1. Field

The disclosure relates generally to an improved data processing system, and more specifically to a computer implemented method, data processing system, and computer program product for managing and monitoring information technology service delivery process behavior and tracking the impact of changes made to the process to ensure the process meets service customer requirements.

2. Description of the Related Art

Information technology (IT) service delivery systems provide technology services and solutions to customers in support of a customer's business strategies. Within such systems, a service delivery process may comprise a set of interrelated tasks used to accomplish the goal of delivering a service to an end user. Monitoring components in the service delivery system may monitor aspects of the service delivery process for performance and quality to ensure that service delivery processes are available, performing, and meeting the needs of the end users.

Performance indicators are used in the monitoring components in a service delivery system to gauge the effectiveness of a service delivery process. A performance indicator comprises a set of measurement values used to determine whether a threshold level has been met for some product or process. A key performance indicator (KPI) is a set of critical measurements that a company or industry may use to determine whether strategic and/or operational goals have been met by the service delivery process and the progress made towards those goals. Examples of performance indicators include, for example, time, cost, and throughput, among others. Key performance indicators are also commonly used to analyze and review delivery processes to determine which areas in the processes may be improved upon or corrected.

SUMMARY

According to one embodiment of the aspects of the disclosure, a computer implemented method, data processing system, and computer program product is provided for managing and monitoring information technology service delivery process behavior and tracking the impact of changes made to the process to ensure the process meet service customer requirements. Key performance metrics of a service delivery process are collected by a performance measurement system in a continuous manner at defined time intervals. When a change is applied to the service delivery process at one of the defined time intervals to enable the service delivery process to meet a set of performance objectives, the performance measurement system continues to collect the key performance metrics at the defined time intervals. Key performance metrics collected prior to applying the change are baseline performance measurements, and key performance metrics collected after applying the change are post-change performance measurements. A process behavior graph of the service delivery process may be generated comprising an x-axis representing the defined time intervals, and a y-axis representing key performance metric values. Each baseline performance measurement and post-change performance measurement collected is represented on the process behavior graph at the time interval collected and at the key performance metric value measured, as well as the time interval in which the change was applied to the service delivery process and the set of performance objectives for the service delivery process. The process behavior graph is then displayed to a user to enable the user to determine the impact the change has on the service delivery process in view of differences between the baseline performance measurements and post-change performance measurements, and to determine whether the service delivery process meets performance objectives based on the collected key performance metrics in view of the set of performance objectives.

DETAILED DESCRIPTION

Figure 1:
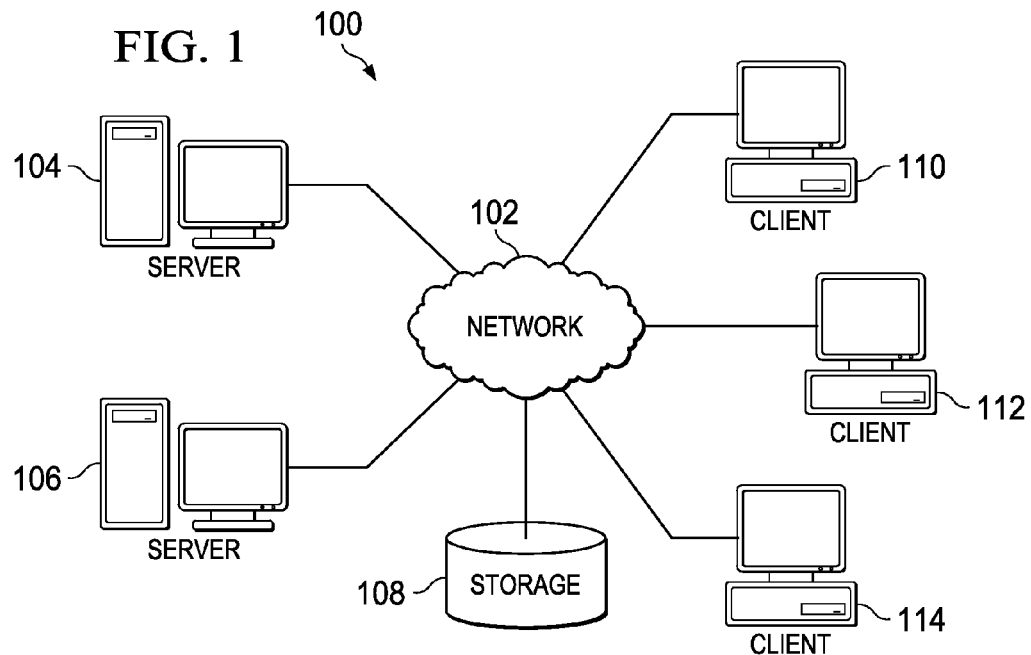
FIG. 1 depicts a pictorial representation of a distributed data processing system in which the illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
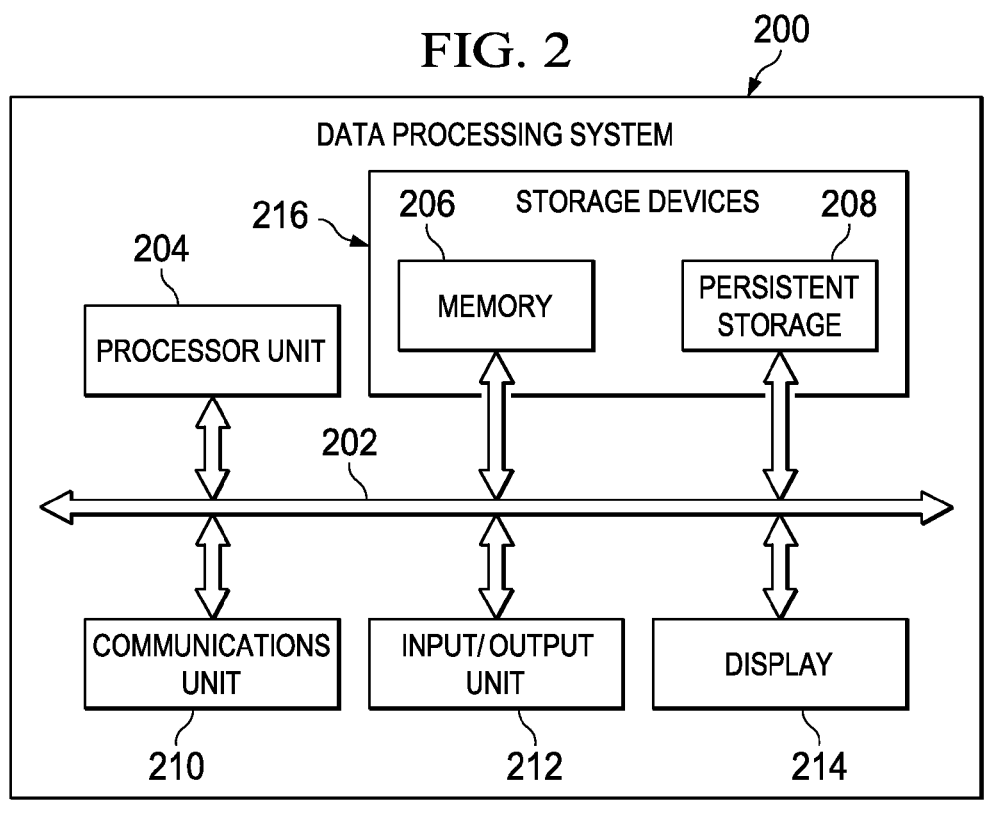
FIG. 2 is a block diagram of a data processing system in which the illustrative embodiments may be implemented.
Figure 2:
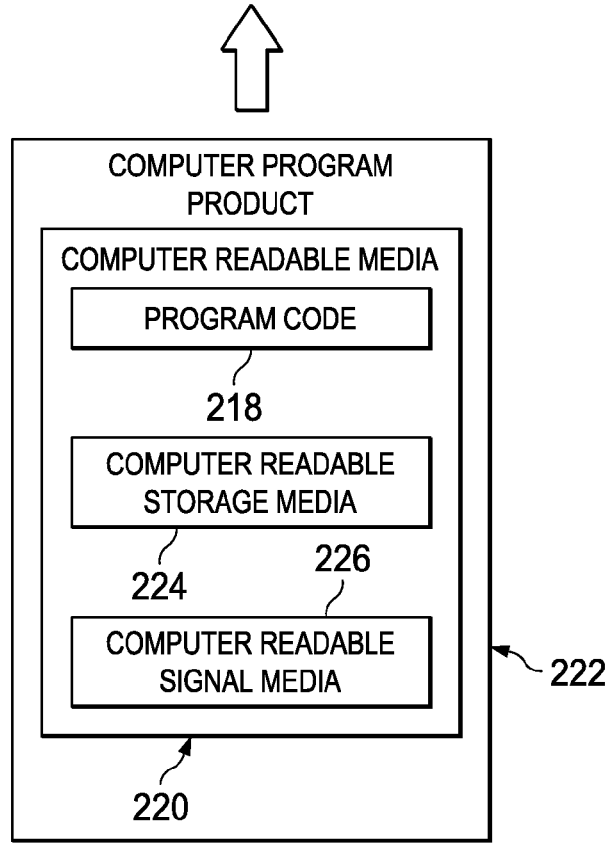

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number as used herein with reference to an item means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage medium 224 or computer readable signal medium 226. Computer readable storage medium 224 may include, for example, an optical or magnetic disc that is inserted or placed into a drive or other device that is part of persistent storage 208 for transfer onto a storage device, such as a hard drive that is part of persistent storage 208. Computer readable storage medium 224 also may take the form of a persistent storage, such as a hard drive, a thumb drive, or a flash memory that is connected to data processing system 200. In some instances, computer readable storage media 224 may not be removable from data processing system 200. In these illustrative examples, computer readable storage medium 224 is a non-transitory computer readable storage medium.

Alternatively, program code 218 may be transferred to data processing system 200 using computer readable signal media 226. Computer readable signal media 226 may be, for example, a propagated data signal containing program code 218. For example computer readable signal media 226 may be an electro-magnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub, that may be present in communications fabric 202.

The illustrative embodiments provide a measurement system for continuously monitoring, measuring, and tracking the performance of information technology service delivery processes. When providing a service to a customer, a service delivery provider may be configured to apply changes to the service delivery process in order to improve the performance of the process. These changes may include new ideas developed or adopted by IT service personnel that serve to continuously improve the effectiveness of the service delivery process and ensure service delivery meets the expectations and requirements of the service customer. The measurement system in the illustrative embodiments monitors the process and collects measurements for a set of key performance indicator (KPI) metrics at pre-defined time period intervals. Measurements collected prior to a change being applied to the service delivery process are baseline measurements. These baseline measurements establish a baseline performance reading of the service delivery process. As changes are applied to the service delivery process, the measurement system continues to monitor the service delivery process and collects measurements for the set of KPI metrics at the pre-defined time period intervals. Measurements collected after a change is applied to the service delivery process are post-change measurements. The post-change measurements reflect the performance of the service delivery process after a change to improve the performance of the process has been applied to the process.

The measurement system displays the collected baseline and post-change measurements in a process behavior graph together with the changes made to the service delivery process. A change may be displayed as a point in time at which the change was applied to the service delivery process. In addition, the process behavior graph displays the performance objectives for the service delivery process. The performance objectives may comprise the levels of service delivery performance as specified or required by the service customer, such as within a service level agreement (SLA). As the process behavior graph maps the collected baseline, post-change measurements and the change points against the performance objectives, the process behavior graph allows a user to quickly view and determine whether the performance of the service delivery process is predictable and/or currently meets the customer's expectations and requirements. In addition, by comparing the post-change measurements in the process behavior graph to the baseline measurements, the measurement system may determine the impact each change has had on the delivery of services. Furthermore, the process behavior graph pinpoints problem areas in the process, thereby allowing a user to focus on a "significant few" data measurements when performing a process behavior analysis rather than the "trivial many" as in traditional performance displays. Consequently, IT service personnel may readily determine whether and to what extent the changes made to the service delivery process have affected and improved the performance of the processes over time. The measurement system may also determine and suggest corrective changes to the service delivery process that may be taken by the user in order to improve and align delivery performance with performance objectives and customer requirements.

Figure 3:
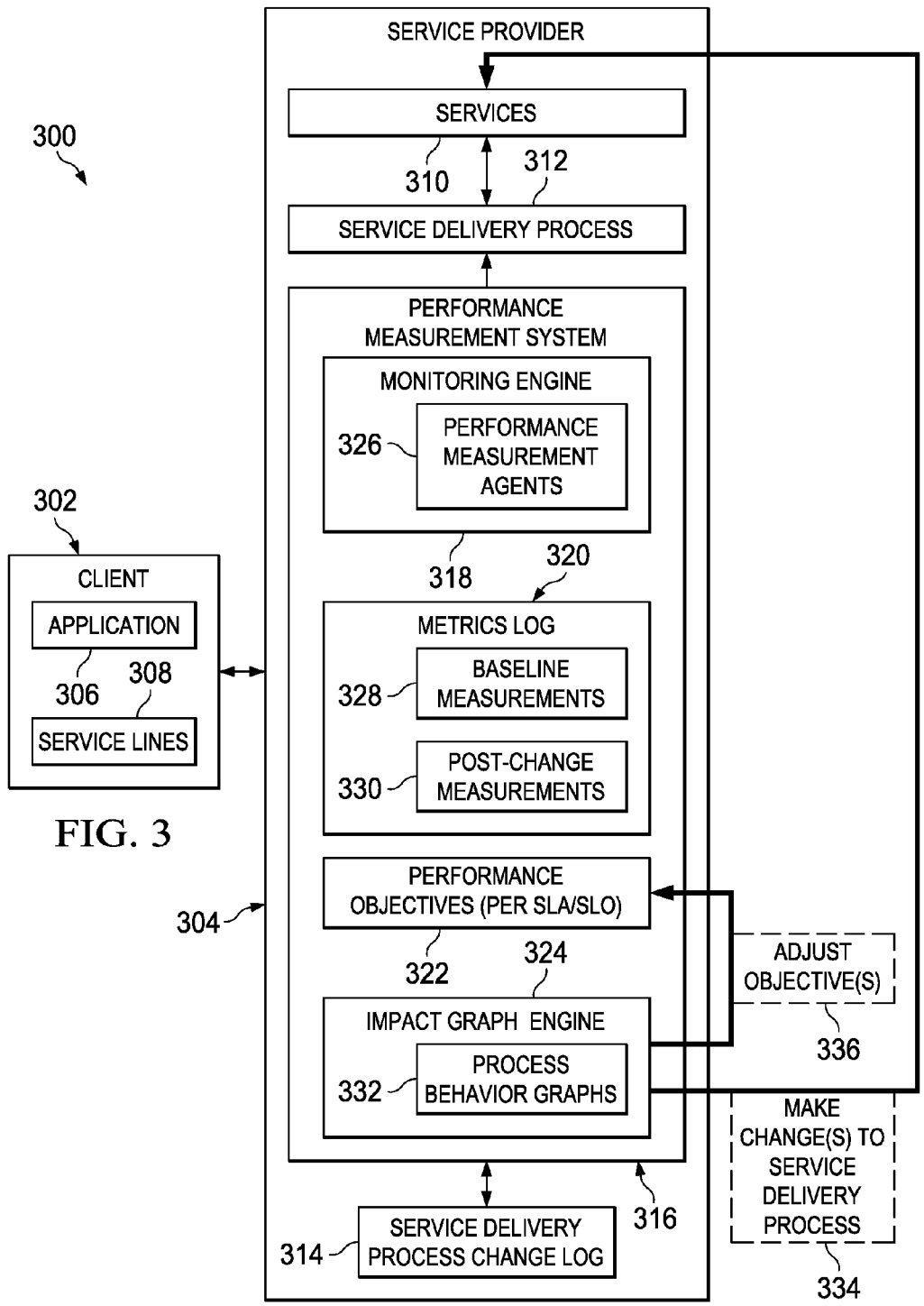
FIG. 3 is a block diagram of components used to implement the service delivery system in accordance with the illustrative embodiments.

FIG. 3 is a block diagram of components used to implement the service delivery measurement system in accordance with the illustrative embodiments. In this illustrative example, data processing system 300 comprises client computer 302 and service provider 304. Client 302 and service provider 304 may be connected via a network, such as network 102 in FIG. 1. However, it should be noted that data processing system 300 is only meant as an example and not intended as a limitation on different illustrative embodiments. In other words, data processing system 300 may include more or fewer components as necessary to accomplish processes of the different illustrative embodiments.

Client 302 is an example of client 110, 112, or 114 in FIG. 1. Client 302 includes client application 306, which may request one or more services from service provider 304. In one embodiment, client 302 may request and receive access to a particular information technology-based service using a standard communication protocol, such as Hypertext Transfer Protocol (HTTP). Client 302 also includes a set of service lines 308. A service line is a group of services that are related to each other by factors, such as the type of business need they satisfy. Examples of service lines 308 may include server system operations (SSO) such as UNIX® or Intel® and the like, storage services, database services, advanced hosting systems (AHS) services, among others. UNIX is a registered trademark of The Open Group in the United States and other countries. Intel is a registered trademark of Intel Corporation or its subsidiaries in the United States and other countries.

Service provider 304 is an example of server 104 or 106 in FIG. 1. Service provider 304 is an entity that provides information technology services to customers over a network. Service provider 304 comprises services 310, service delivery process 312, service delivery process change log 314, and performance measurement system 316. Services 310 comprise information technology services that may be provided to client 302. Some examples of these services include Internet access, mobile phone operators, web application hosting, among many others. Service delivery process 312 may be implemented by service provider 304 in order to provide services 310 to a requesting client. A service delivery process comprises a set of interrelated tasks used to accomplish the goal of delivering the requested service 310 to client 302.

Performance measurement system 316 is a utility that collects and displays statistical indicators for measuring the performance of service delivery process 312. In one embodiment, performance measurement system 316 may be implemented as a software application within service provider 304. Alternatively, performance measurement system 316 may be implemented in hardware, or a combination of software and hardware. In this illustrative example, performance measurement system 316 comprises monitoring engine 318, metrics log 320, performance objectives 322, and impact graph engine 324.

Monitoring engine 318 is a monitoring component that is used to monitor and collect measurements data for a set of key performance indicator (KPI) metrics. A KPI metric is a set (one or more) of critical measurements that may be used to determine whether strategic and/or operational goals have been met by service delivery process 312 and the progress made towards those goals. The KPI metrics to be measured for a particular service delivery process may be defined by subject matter experts from the Service Line (e.g., SSO Database, SSO Unix and Intel, SSO Systems Operations) in order to pinpoint specific aspects of service delivery performance. A subject matter expert may be an experienced member of a team with deep knowledge of the process and the data. Metric-delivery process associations may be defined on a global basis, thereby allowing performance monitoring systems in various locations to employ the defined metrics when monitoring a service delivery process. The subject matter experts may define the KPI metrics to be measured for a service delivery process based on various factors, including, for example, determining which step(s) in the process have greatest impact on making the performance metric go up or down, what process measure will provide the most insight as to whether the performance metric will go up or down, and what action a user may take with the measurement data.

In one embodiment, the KPI metrics comprise measurements corresponding to the quality, productivity, and health of the service delivery processes. For a particular example of server system operations (SSO) such as UNIX and Intel, examples of quality metrics for service delivery process 312 in this service line may include percent of tickets resolved out of criteria, time to resolve, percent failed changes, among others. Examples of productivity metrics for service delivery process 312 may include problem tickets per 1000 service images, percent of total work orders, total work orders closed per effort, server images per effort, work order backlog, among others. Examples of health metrics for service delivery process 312 may include overtime hours by staff, attrition rate, among others. The particular set of quality, productivity, and health metrics may be monitored on an individual service basis or on a service line basis. For example, the subject matter experts may specify that KPI metrics should be monitored on an individual service basis, or alternatively, the subject matter experts may specify that KPI metrics will be monitored for all services falling within a same line of service lines 308.

Performance measurement agents 326 are utilized by monitoring engine 318 to collect measurements for the set of KPI metrics associated with the particular service being delivered. A performance measurement agent is a monitoring agent that runs in the background and monitors and measures one or more KPI metrics for a service being delivered to client 302. Performance measurement agents 326 query the monitored service delivery process 312 to collect measurement data for later analysis by impact graph engine 324. Performance measurement agents 326 may continuously monitor and gather data. Performance measurement agents 326 may also collect the measurements at periodic time intervals in an iterative process. The time intervals in which the agents collect measurement data may be defined by the subject matter experts.

Service delivery process change log 314 comprises a file that stores changes applied to service delivery process 312 to improve performance of the processes. Change information stored in service delivery process change log 314 may include the number of changes made to a service delivery process, a time each change is applied to a delivery process, a description of the change made (e.g., change type), and/or the components to which the change was applied, among others. Examples of changes that may be made to a service delivery process and the change descriptions include, but are not limited to, introduction of a quality program, adding resources, removing resources, adding an extra stop per client request, scope change, etc. In one embodiment, changes to a service delivery process comprise adjustments that enable the delivery process to meet customer-specified requirements and/or other performance objectives. Customer-specified requirements may comprise performance levels agreed to by the client and the service provider as defined in a service level agreement (SLA). A service level agreement is a service contract where an expected level of service is formally defined. The service level agreement may specify measurable performance characteristics such as availability, throughput, frequency, response time, or quality, and the minimum and target performance values required to be met by the service provider. In situations where no service level agreement exists between a client and the service provider, performance objectives may be specified and used internally by the service provider as service level objectives (SLOs) that the service provider wants to meet in order to optimize and increase the efficiency of the performance of the service delivery process. The service level objectives may also include minimum and target performance values for characteristics such as availability, throughput, frequency, response time, or quality as specified internally by the service provider.

Changes may be applied to the service delivery process using a standard 'wave' approach or a continuous approach. In the standard wave approach, changes may be applied to the service delivery process in a structured approach where IT personnel diagnoses current process flow, designs future process state, and validates future process state design. This structured approach is based on pre-set start and end dates and includes quality gates at the end of each phase to ensure quality and progress. After using the standard wave approach to apply changes to a service delivery process, changes may be applied using the continuous approach as the service provider transitions to a steady state. Regardless of the approach used to apply changes to a service delivery process, as the changes are applied, monitoring engine 318 instructs performance measurement agents 326 to collect measurements for the set of KPI metrics associated with the service being delivered at the defined time period intervals.

Metrics log 320 comprises a file that holds measurements collected for the KPI metrics monitored for a service delivery process in memory. Metrics log 320 includes baseline measurements 328 and post-change measurements 330. Baseline measurements 328 are measurements collected by performance measurements agents 326 prior to a change to the monitored service delivery process being applied. A baseline measurement of a KPI metric may be collected about the service delivery process in accordance with the specified set of time intervals. Post-change measurements 330 include measurements collected by performance measurements agents 326 after a change to the monitored service delivery process is applied. As multiple changes may be applied to the service delivery process over time, a set of measurements collected after a change is applied and stored as post-change measurements in post-change measurements 330, and this set of measurements may also be stored as baseline measurements in baseline measurements 328 and associated with a subsequent change applied to the process, as this set of measurements are baseline measurements for the subsequent change.

Performance objectives 322 are expectations regarding the manner and efficiency in which a requested service should be delivered to the customer. Performance objectives 322 may comprise upper and lower performance boundaries in which a service delivery process is expected to operate. Performance objectives 322 may also comprise a target or desired level of performance by the service delivery process 312. In one embodiment, the performance objectives 322 are requirements specified by a customer. The customer specifications may be defined in a service level agreement negotiated between client 302 and service provider 304. In another embodiment, the performance objectives 322 are requirements specified internally by the service provider as service level objectives.

Impact graph engine 324 is a component that generates a display of the performance of a service delivery process and the impact changes made to the process have on the delivery performance. Impact graph engine 324 retrieves the information in metrics log 320, service delivery process change log 314, and performance objectives 322 and displays the information as process behavior graph 332 to a user. Thus, a process behavior graph for a service delivery process comprises a graphical display of the baseline measurements collected for the process and stored in baseline measurements 328, post-change measurements collected for the process and stored in post-change measurements 330, points of change made to the process, and the expected service delivery performance values for the process. An example of a process behavior graph is further described in FIG. 4.

Process behavior graphs 332 allow a user to view and determine whether the performance of the service delivery process 312 currently meets the customer's expectations and requirements, as well as, the impact a change had on the delivery of services by comparing the post-change measurements 330 in the process behavior graph for a particular change point to the baseline measurements 328 for the change point. Information displayed in the process behavior graphs 332 allows a user to focus on a few data points that appear to be problem areas (e.g., data measurement points falling outside performance objectives) and thus warrant further investigation. The process behavior graphs 332 also enable a user to distinguish real problem areas in the process from noise. Noise may comprise an anomaly or deviation in the data, and is a common variation that should not be examined, as it exists in the context that any process output will vary from instance to instance within certain limits, but in a random fashion. In viewing the graph, users may determine whether and to what extent the changes made to a service delivery process have affected and improved the performance of the processes over time. The inclusion of the performance objectives 322 in the process behavior graphs 332 enables a user to view when a process is not meeting performance targets, either set by the client in a service level agreement, or internally by the service provider as a service level objective. As measurements for the process are continuously collected, when the user determines that the process is not meeting performance objectives, the user may determine that a corrective action 334 is needed to improve performance to a desired target performance. The corrective action may comprise a change to the service delivery process 312. Thus, as process behavior graphs 332 enable a user to monitor the performance of service delivery process 312, when the user determines that a new change to the service delivery process 312 is needed to improve the performance of the process in order to meet performance objectives 322, the user may see the impact this new corrective action change makes on the process as the process behavior graph 332 is updated to reflect the new change point and the newly collected (post-change) performance measurements.

At some point, the user may determine that instead of taking a corrective action in the form of making a change to the service delivery process 312 in order to improve performance such that the performance is in line with the performance objectives 322, the performance objectives 322 themselves should be adjusted, as the performance objectives 322 may be set too high or low. The user may make this determination when the user determines that the SLAs or SLOs are too stringent and thus cannot be met by the process, and should be adjusted by renegotiating the agreement. Thus, based on the data displayed in process behavior graphs 332, the user may make a corrective action in the form of adjusting 336 the performance objectives, in order to enable the service delivery process 312 to meet the targets specified in performance objectives 322.

Figure 4:
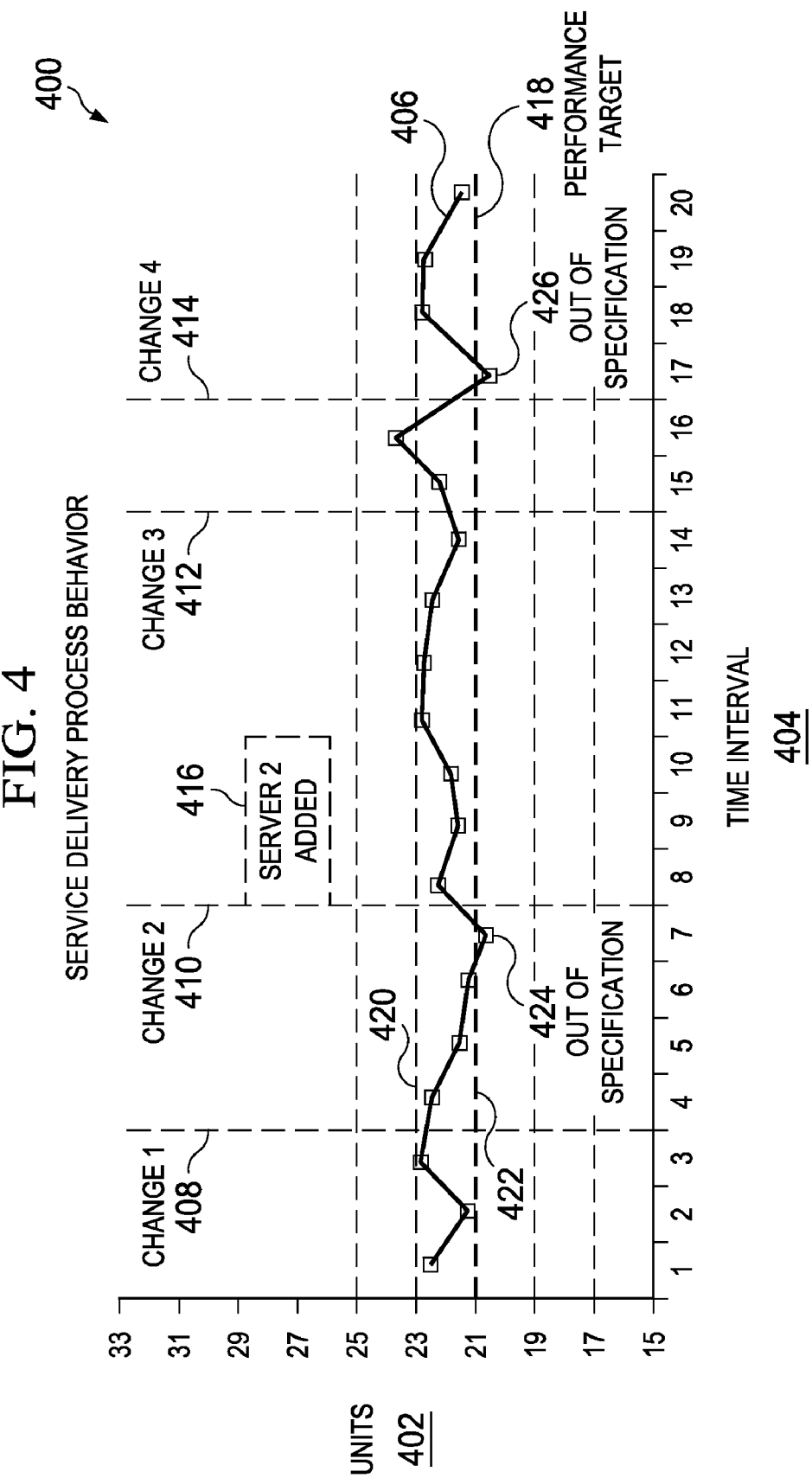
FIG. 4 is an exemplary process behavior graph depicting collected KPI measurements, customer performance objectives, and change points in accordance with the illustrative embodiments.

FIG. 4 is an exemplary process behavior graph depicting collected KPI measurements, customer performance objectives, and change points in accordance with the illustrative embodiments. Process behavior graph 400 is an example of process behavior graphs 332 in FIG. 3 and displays service delivery measurement data plotted on a graph corresponding to standard intervals of time. Impact graph engine 324 in FIG. 3 generates the process behavior graph and displays the graph to a user. Process behavior graph 400 allows users to visualize and follow trends in the performance data (an increase, decrease, or no change) over a period of time and determine the impact changes to the service delivery process have on the process. Process behavior graph 400 also allows the user to compare service delivery process performance before and after the implementation of changes to the process, as well as identify when corrective actions should be taken to manage the trends.

In this illustrative example, process behavior graph 400 comprises a line graph that displays how continuously collected KPI measurements may vary over time in response to changes applied to the service delivery process. The y-axis 402 represents the measurement data in units, and the x-axis 404 represents the time intervals at which the KPI measurements are collected. The impact graph engine plots the collected measurements corresponding to the time interval at which the measurements were collected, and connects the dots to form data line 406 indicating the trend of measurement data observed over the given time period.

Changes applied to the service delivery process to improve performance of the process and enable the delivery process to meet customer-specified requirements and/or other target objectives are shown as change points 1 408, 2 410, 3 412, and 4 414. For example, change point 1 408 represents a change made to the service delivery process at time interval 4. KPI measurements collected about the process prior to change point 1 408 are baseline measurements for that particular change applied to the process, while KPI measurements collected after change point 1 408 are post-change measurements for that change. Similarly, change point 2 410 represents a change made to the service delivery process at time interval 8. KPI measurements collected about the process prior to change point 2 410 are baseline measurements for that particular change applied to the process, while KPI measurements collected after change point 2 410 are post-change measurements for that change.

Examples of changes that may be made to a service delivery process include, but are not limited to, introduction of a quality program, adding resources, removing resources, adding an extra stop per client request, scope change, etc. The changes displayed in the process behavior graph allows a user to determine the number of changes that have been applied to the service delivery process, and the time interval at which a particular change was made. In one embodiment, selection of a particular change (such as, by hovering the mouse over a displayed change point) may also display a description of the change made (e.g., such as, via callout box 416 or popup window), as well as other information about the change. Impact graph engine 324 in FIG. 3 may obtain this description and other change information from service delivery process change log 314.

Process behavior graph 400 also displays a performance target line 418 that indicates the performance target for the process as specified by the client in a service level agreement or internally by the service provider as a service level objective. Performance target line 418 displays a desired performance level of the service delivery process as expected by the customer. In addition to performance target line 418, other performance objectives may be displayed in process behavior graph 400, such as minimum levels of performance between which the service delivery process is expected to operate. An upper performance line 420 may be used to indicate the upper acceptable control limit of performance for the process, while a lower performance line 422 may be used to indicate the lower acceptable control limit of performance for the process. Thus, the minimum levels of performance specify the acceptable measurement boundaries for the service delivery process, and the performance target indicates the desired measurements for the process. A process that produces collected metrics that consistently fall within the upper and lower limits of the minimum performance levels is predictable, in that a user may predict that the behavior of the process will consistently meet customer expectations and requirements. If the metrics do not consistently fall within the upper and lower limits and thus a user cannot predict how the process will behave, changes may be applied to the service delivery process in an effort to move the measurements into the acceptable minimum level boundaries and, if measurements are already within the acceptable minimum level boundaries, closer to the performance target.

In this illustrative example, by observing the line graph, a user may see that in most instances, the measurement collected at each time interval indicates that the performance of the service delivery process is generally in alignment with the upper and lower control limits. However, measurement points 424 and 426 indicate that these performance measurements collected fall below the lower performance line 422 and performance target 418 and thus are out of specification with predictable process behavior. Consequently, the user may determine that the service delivery process is not currently capable of consistently meeting the customer's requirements. The user may also determine, based on the change points in the line graph, which changes implemented to the service delivery process positively or negatively affected the performance of the process. For instance, a change implemented at change point 1 408 may be determined to have hindered process performance based on post-change measurements collected at time intervals 4-7 and caused performance to fall below performance target 418, while a change implemented at change point 2 410 may be determined to have improved process performance based on post-change measurements collected at time intervals 8-13 and returned performance to be in alignment with the performance objectives.

Process behavior graph 400 also enables a user to view variations within the measurements collected for a service delivery process. These variations may include measurement points that fall outside the upper and lower measurement limits for the process, trends of a particular number of measurement points (e.g., all increasing or decreasing), consecutive runs of particular number of measurement points below or above the performance target line, non-random behavior, among others. A user may apply changes to the service delivery process as a corrective action in order to align process performance to the performance target line 418.

Figure 5:
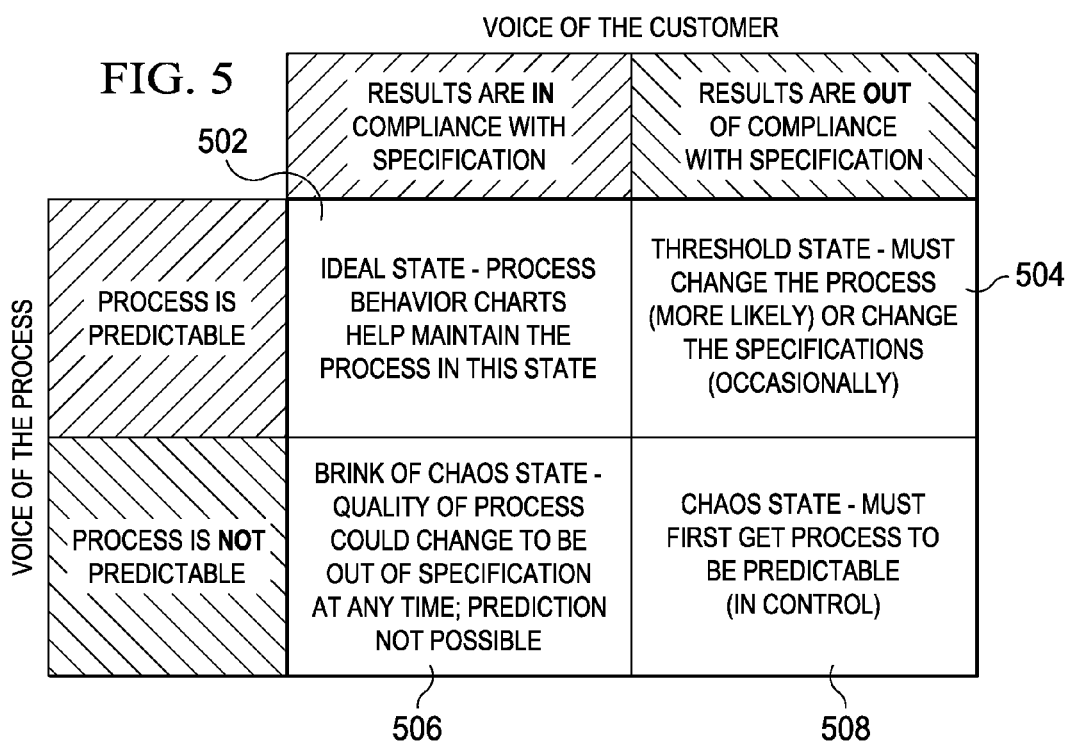
FIG. 5 is a chart illustrating exemplary states of a service delivery process in accordance with the illustrative embodiments.

FIG. 5 is a chart illustrating exemplary states of a service delivery process in accordance with the illustrative embodiments. The state of a service delivery process may be determined from viewing the process behavior graph, such as process behavior graph 400 in FIG. 4, which may be generated by impact graph engine 324 in FIG. 3 for the process. From the process behavior graph, a user may determine the service delivery process is operating in one of four states: ideal state 502, threshold state 504, brink of chaos state 506, and chaos state 508.

Ideal state 502 is a desired state for a service delivery process. In ideal state 502, the process is predictable in that the KPI metrics collected for the process fall within the defined upper and lower control limits, such as upper performance line 420 and lower performance line 422 in FIG. 4, and a user may thus predict how the process will behave. The process in an ideal state is also determined to be meeting customer expectations as defined by a defined performance target, such as performance target line 418 in FIG. 4.

Threshold state 504 is a state in which the process is predictable in that the KPI metrics collected for the process consistently fall within the defined upper and lower control limits, and thus the user may predict that the process will continue to do so. However, the KPI metrics also indicate that the process is not meeting customer expectations, such as, when the metrics collected for the process are consistently falling below the expected performance level indicated by the performance target line. A user may apply changes to the service delivery process as a corrective action in order to align process performance to the performance target line.

Brink of chaos state 506 is a state in which the process is meeting customer expectations, indicated by the KPI metrics collected for the process consistently falling above the expected performance indicated by the performance target line. However, the KPI metrics also indicate that the process is unpredictable, such as, when the metrics collected for the process do not fall within the defined upper and lower control limits (e.g., the metrics fluctuate by falling within and also over the upper control limit). As the metrics may continuously fluctuate across the control limits in the brink of chaos state 506 resulting in an unpredictable performance scenario, there is no guarantee that the service delivery process will also continue to meet customer expectations. A user may apply changes to the service delivery process as a corrective action in order to align process performance to fall within the defined upper and lower control limits.

Chaos state 508 is a state in which the process is neither predictable as indicated by the KPI metrics collected for the process not falling within the defined upper and lower control limits, or meeting customer expectations as indicated by the metrics consistently falling below the expected performance indicated by the performance target line. A user may first apply changes to the service delivery process as a corrective action in order to bring the process performance under control so that the performance falls within the defined upper and lower control limits. The user may then make further adjustments to the process in order to bring the performance in alignment with the customer expectations and closer to the performance target line in the process behavior graph.

Figure 6:
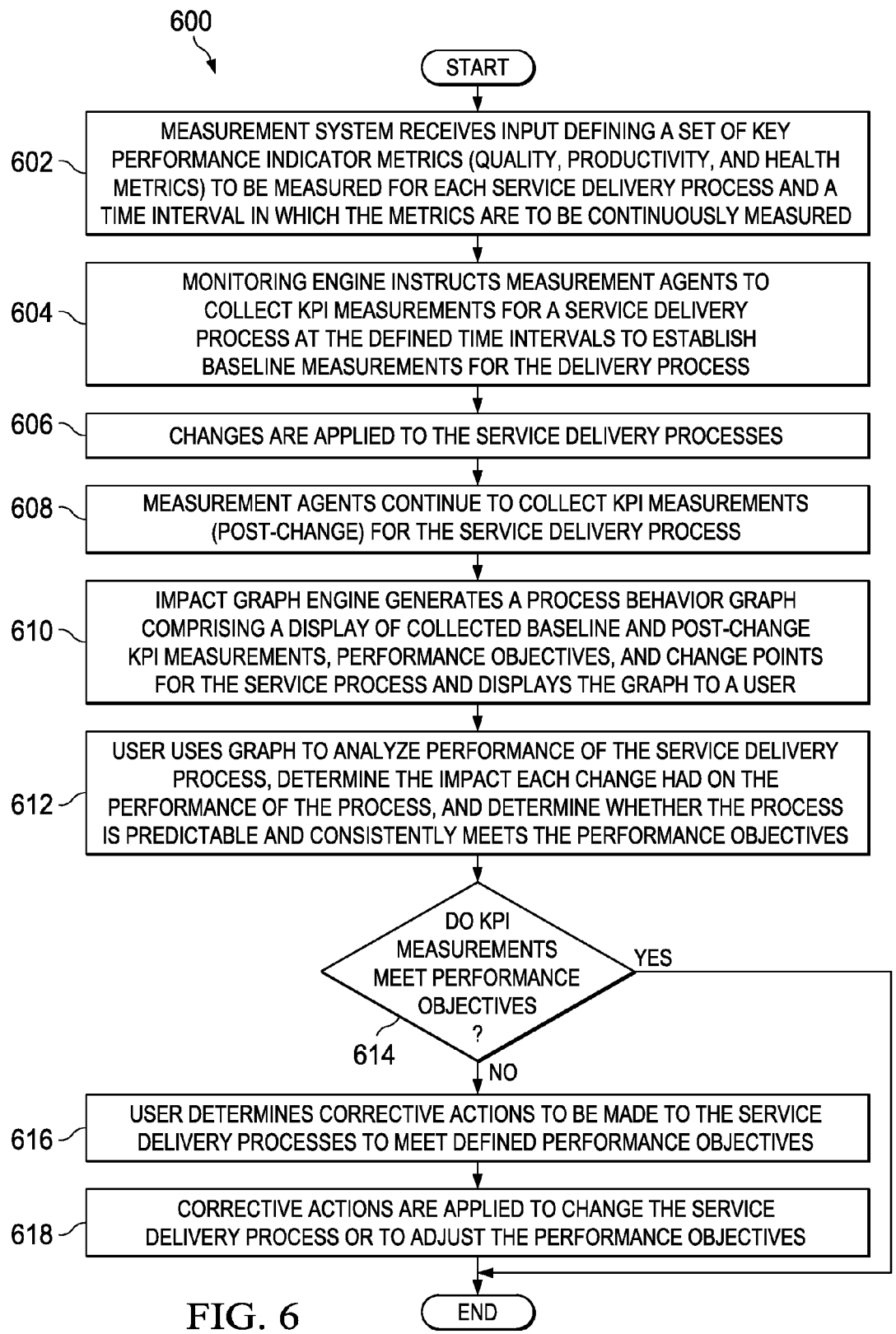
FIG. 6 is a flowchart of a process for monitoring service delivery process to determine the impact of changes on the service delivery process in view of the performance objectives and targets of the service customers.

FIG. 6 is a flowchart of a process for monitoring service delivery process to determine the impact of changes on the service delivery process in view of the goals and objectives of the service customers. The process described in FIG. 6 may be implemented by performance measuring system 316 in FIG. 3.

The process begins with the measurement system in the service provider receiving input from subject matter experts that define a set of performance metrics to be measured for and associated with a service delivery process and a time interval in which the metrics are to be continually measured (step 602). The set of performance metrics are defined to provide measurements about the quality, productivity, and health of the service delivery process. Once the desired performance metrics and time intervals for measuring the metrics have been specified, a monitoring engine component in the performance measurement system instructs monitoring agents to continuously monitor and collect the measurements of the selected set of performance metrics for the service delivery process (step 604). The measurement agents may be located on the service provider, the client, or a combination of both. Measurements collected by the monitoring agents before changes are applied to the service delivery process are baseline measurements that establish baseline performance measurement readings for the process.

One or more changes are then applied to the service delivery process (step 606). These changes to the service delivery process may be applied to the process in order to attempt to bring the process in alignment with performance objectives for the process and thereby meet the expectations and requirements of the customer. As changes are applied to the service delivery process, the monitoring engine, at each defined time interval, collects KPI performance measurements (i.e., post-change) for the service delivery process (step 608). Post-change performance metrics comprise measurements collected after one or more changes have been applied to the service delivery process.

Next, an impact graph engine generates a process behavior graph comprising a display of the collected baseline and post-change KPI measurements, performance objectives, and change points for the service process (step 610). An example of the process behavior graph is shown in FIG. 4. From the process behavior graph, a user may analyze performance of the service delivery process, determine the impact each change had on the performance of the process, and determine whether the process is predictable and consistently meets the performance objectives (step 612). A determination may be made by the impact graph engine whether any post-change measurements fall outside of the performance objectives (e.g., minimum performance limits or performance target) (step 614). A process may fail to consistently meet the performance objectives and be deemed not capable of consistently meeting the customer's needs if any post-change KPI measurement or if a certain portion of post-change KPI measurements collected fall outside the specified performance objectives.

If the impact engine determines that the KPI measurements consistently meet the customer-specific target objectives ('yes' output of step 614), the process terminates thereafter. However, if the impact engine determines that the KPI measurements do not consistently meet the performance objectives ('no' output of step 614), the user may determine corrective actions to be made to the service delivery process to meet defined performance targets (step 616). These corrective actions may comprise changes to the service delivery process to bring the performance of the service delivery process in line with the desired target performance objectives. In another embodiment, the corrective action may comprise adjustments made to the performance objectives. The corrective actions may then be applied to change the service delivery process or adjust the performance objectives as needed (step 618).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing performance of an information technology service delivery process, the method comprising the steps of:
    a computer collecting a first plurality of actual measurement values of key performance indicator metrics of the information technology service delivery process while an information technology service is being delivered to a customer;
    the computer changing the information technology service delivery process at a preset time, wherein the changing comprises making a preset change in order to enable the information technology service delivery process to meet a set of performance objectives;
    after the step of the computer changing the information technology service delivery process, the computer collecting a second plurality of actual measurement values of the key performance indicator metrics while the information technology service is being delivered to the customer;
    the computer generating a process behavior graph having an x-axis that represents time and a y-axis that represents a range of measurement values, wherein the computer generating the process behavior graph further comprises:
        the computer plotting the first plurality of actual measurement values on the process behavior graph in a first time interval that starts at a first representation of a first time and ends at a preset representation of the preset time to form first plotted values;
        the computer plotting the second plurality of actual measurement values on the process behavior graph in a second time interval that starts at the preset representation of the preset time and ends at a second representation of a second time to form second plotted values;
        the computer including a continuous data line on the process behavior graph that connects the first plotted values and the second plotted values;
        the computer including a performance target line on the process behavior graph from the first representation of the first time to the second representation of the second time, wherein the performance target line indicates a minimum acceptable level of performance of the information technology service delivery process; and
        the computer including a change point on the process behavior graph at the preset representation of the preset time; and
    the computer displaying the generated process behavior graph to a user.

2. The method of claim 1, wherein the computer displaying the generated process behavior graph to the user enables the user to determine an impact the preset change has on the information technology service delivery process in view of differences between the first plurality of actual measurement values and the second plurality of actual measurement values.

3. The method of claim 1, further comprising the steps of:
    after the step of the computer displaying the generated process behavior graph to the user, the computer receiving an indication that the change point has been selected, wherein the indication is made by causing a cursor to hover over the change point; and
    the computer displaying a description of the preset change adjacent to the change point.

4. The method of claim 1, wherein the computer displaying the generated process behavior graph to the user enables the user to identify at least one of the first plurality of actual measurement values that indicate a problem in the information technology service delivery process, wherein the at least one of the first plurality of actual measurement values is depicted below the performance target line.

5. The method of claim 4, further comprising the step of:
    the computer receiving input from the user, the received input comprising a corrective action to apply to the information technology service delivery process.

6. The method of claim 5, wherein the corrective action comprises applying a second change to the information technology service delivery process to enable the information technology service delivery process to meet the set of performance objectives.

7. The method of claim 5, wherein the corrective action comprises adjusting the set of performance objectives.

8. The method of claim 1, wherein the set of performance objectives includes minimum levels of performance within which the information technology service delivery process is required to operate.

9. The method of claim 1, wherein the set of performance objectives includes the minimum acceptable level of performance.

10. The method of claim 1, wherein the set of performance objectives are defined in a service level agreement.

11. The method of claim 1, wherein the key performance indicator metrics comprise measurements defining quality and productivity characteristics of the information technology service delivery process.

12. The method of claim 1, wherein the process behavior graph illustrates a current state of the information technology service delivery process.

13. The method of claim 12, wherein when the current state of the information technology service delivery process is in a threshold state, a performance of the information technology service delivery process does not meet the set of performance objectives but a behavior of the information technology service delivery process is predictable.

14. The method of claim 12, wherein, when a performance of the information technology service delivery process meets the set of performance objectives but a behavior of the information technology service delivery process is not predictable, a corrective action is applied in order to raise the performance of the information technology service delivery process to be above the minimum acceptable level of performance.

15. A computer program product for managing performance of an information technology service delivery process, the computer program product comprising:
    one or more computer-readable tangible storage devices;
    program instructions, stored on at least one of the one or more storage devices, to collect a first plurality of actual measurement values of key performance indicator metrics of the information technology service delivery process while an information technology service is being delivered to a customer;
    program instructions, stored on at least one of the one or more storage devices, to change the information technology service delivery process at a preset time, wherein the program instructions to change the information technology service delivery process make a preset change in order to enable the information technology service delivery process to meet a set of performance objectives;
    program instructions, stored on at least one of the one or more storage devices, to collect a second plurality of actual measurement values of the key performance indicator metrics while the information technology service is being delivered to the customer and after changing the information technology service delivery process at the preset time;

program instructions, stored on at least one of the one or more storage devices, to generate a process behavior graph having an x-axis that represents time and a y-axis that represents a range of measurement values, wherein the program instructions to generate the process behavior graph further comprise:

program instructions to plot the first plurality of actual measurement values on the process behavior graph in a first time interval that starts at a first representation of a first time and ends at a preset representation of the preset time to form first plotted values;

program instructions to plot the second plurality of actual measurement values on the process behavior graph in a second time interval that starts at the preset representation of the preset time and ends at a second representation of a second time to form second plotted values;

program instructions to include a continuous data line on the process behavior graph that connects the first plotted values and the second plotted values;

program instructions to include a performance target line on the process behavior graph from the first representation of the first time to the second representation of the second time, wherein the performance target line indicates a minimum acceptable level of performance of the information technology service delivery process; and program instructions to include a change point on the process behavior graph at the preset representation of the preset time; and program instructions, stored on at least one of the one or more storage devices, to display the generated process behavior graph to a user.

16. A computer system for managing performance of an information technology service delivery process, the computer system comprising:

one or more processors, one or more computer-readable memories and one or more computer-readable tangible storage devices;

program instructions, stored on at least one of the one or more storage devices for execution by at least one of the one or more processors via at least one of the one or more memories, to collect a first plurality of actual measurement values of key performance indicator metrics of the information technology service delivery process while an information technology service is being delivered to a customer;

program instructions, stored on at least one of the one or more storage devices for execution by at least one of the one or more processors via at least one of the one or more memories, to change the information technology service delivery process at a preset time, wherein the program instructions to change the information technology service delivery process make a preset change in order to enable the information technology service delivery process to meet a set of performance objectives;

program instructions, stored on at least one of the one or more storage devices for execution by at least one of the one or more processors via at least one of the one or more memories, to collect a second plurality of actual measurement values of the key performance indicator metrics while the information technology service is being delivered to the customer and after changing the information technology service delivery process at the preset time;

program instructions, stored on at least one of the one or more storage devices for execution by at least one of the one or more processors via at least one of the one or more memories, to generate a process behavior graph having an x-axis that represents time and a y-axis that represents a range of measurement values, wherein the program instructions to generate the process behavior graph further comprise:

program instructions to plot the first plurality of actual measurement values on the process behavior graph in a first time interval that starts at a first representation of a first time and ends at a preset representation of the preset time to form first plotted values;

program instructions to plot the second plurality of actual measurement values on the process behavior graph in a second time interval that starts at the preset representation of the preset time and ends at a second representation of a second time to form second plotted values;

program instructions to include a continuous data line on the process behavior graph that connects the first plotted values and the second plotted values;

program instructions to include a performance target line on the process behavior graph from the first representation of the first time to the second representation of the second time, wherein the performance target line indicates a minimum acceptable level of performance of the information technology service delivery process; and program instructions to include a change point on the process behavior graph at the preset representation of the preset time; and program instructions, stored on at least one of the one or more storage devices for execution by at least one of the one or more processors via at least one of the one or more memories, to display the generated process behavior graph to a user.

\* \* \* \* \*